United States Patent [19]

Finzel

[11] Patent Number: 4,850,671
[45] Date of Patent: Jul. 25, 1989

[54] CONNECTOR DEVICE FOR LIGHT WAVEGUIDES

[75] Inventor: Lothar Finzel, Munich, Fed. Rep. of Germany

[73] Assignee: Siemens Aktiengesellschaft, Berlin and Munich, Fed. Rep. of Germany

[21] Appl. No.: 168,992

[22] Filed: Mar. 16, 1988

[30] Foreign Application Priority Data

Mar. 26, 1987 [DE]  Fed. Rep. of Germany ....... 3709895
Nov. 26, 1987 [EP]  European Pat. Off. ........... 87117516

[51] Int. Cl.$^4$ .............................................. G02B 6/38
[52] U.S. Cl. ................................................. 350/96.21
[58] Field of Search ................... 350/96.2, 96.21, 96.22

[56] References Cited

U.S. PATENT DOCUMENTS 4,320,938  3/1982  Gunnersen et al. .............. 350/96.21
4,370,022  1/1983  Johnson ............................ 350/96.21
4,755,018  7/1988  Heng et al. ....................... 350/96.21

FOREIGN PATENT DOCUMENTS

0045594  5/1985  European Pat. Off. .

Primary Examiner—Frank Gonzalez
Assistant Examiner—John Ngo

[57] ABSTRACT

A connector device for two light waveguides, which has a receptacle part formed by a carrier member having a recess receiving a central retaining part, which is movable in a radial direction in the recess, and a pair of pressure members movable from a position to urge the central retaining part radially inward to clamp stripped waveguides in an abutting alignment. The pressing members are constructed so that when in a non-pressing position, they still maintain the central retaining part in a loose, assembled relationship. The device can also include a gripping arrangement at each end for gripping the unstripped portions of the waveguide so that the joint between the two stripped portions is not subjected to tension placed on the waveguides.

27 Claims, 10 Drawing Sheets

CONNECTOR DEVICE FOR LIGHT WAVEGUIDES

BACKGROUND OF THE INVENTION

The present invention is directed to a connector device comprising a receptacle part surrounding two light waveguides and having guides for the waveguides so that contact pressure is produced by two press sleeves, which are mounted for longitudinal displacement on the receptacle part.

A receptacle part, which has guides for receiving two waveguides and having two pressure sleeves mounted for movement in a longitudinal direction of the part to apply a contacting pressure on waveguides in the part, is disclosed by U.S. Pat. No. 4,370,022, which was the basis of European Patent No. 0 045 594. The receptacle part of this patent was constructed as a tubular member of plastic material which had a relatively large bore with reference to the diameter of the light waveguides. Three cylindrical rods were arranged in this bore and the diameter of the rods was selected with reference to the diameter of the stripped optical fiber so that the fiber would be fixed in the inner spacing between the three cylindrical rods. Contact pressure required for this purpose is produced by two pressure sleeves that were arranged outside of the receptacle part. The inside of the pressure sleeves have conical openings or cam surfaces which press onto corresponding conical enlarged portion of the receptacle part when they were moved axially along the part. The play required for the introduction of the light waveguides into the connector part can, thus, be produced only by an appropriate elastic expanding of the receptacle part, since this, as already mentioned, is constructed as a single piece. Conversely, this results in the fact that a correspondingly high contact pressure is likewise required for pressing the optical fibers together with adequate firmness in the assembled condition.

SUMMARY OF THE INVENTION

The object of the present invention is to create a connector device which is easy to assemble, which provides a reliable locking of the optical fibers, and which is constructed in a simple manner with low cost.

To accomplish these goals, the present invention is directed to an improved connector device having a receptacle part for surrounding two light waveguides and having guides for the light waveguides, and having two pressure members, which are mounted for longitudinal movement on the receptacle part to apply or produce the contact pressure in the part. The improvements are that the receptacle part is constructed bipartite, with one part being constructed as a through-carrier member provided with a recess, and the other part being a central retaining part movable in a radial direction in the recess of the carrier member, said central retaining part and the carrier member being held together in the assembled condition by the pressure members, which are seated on the outside of the receptacle part.

Since the receptacle part is constructed of two parts, or is a bipartite, the central retaining part can be held adequately movable in a radial direction by an appropriate dislocation of the pressure sleeve members into a position lying outside of the receptacle part so that the introduction of the optical fibers is enabled in a simple way.

Other advantages and features of the invention will be readily apparent from the following description of the preferred embodiments, the claims and drawings.

DESCRIPTION OF THE PREFERRED EMBODIMENTS

Figure 1:
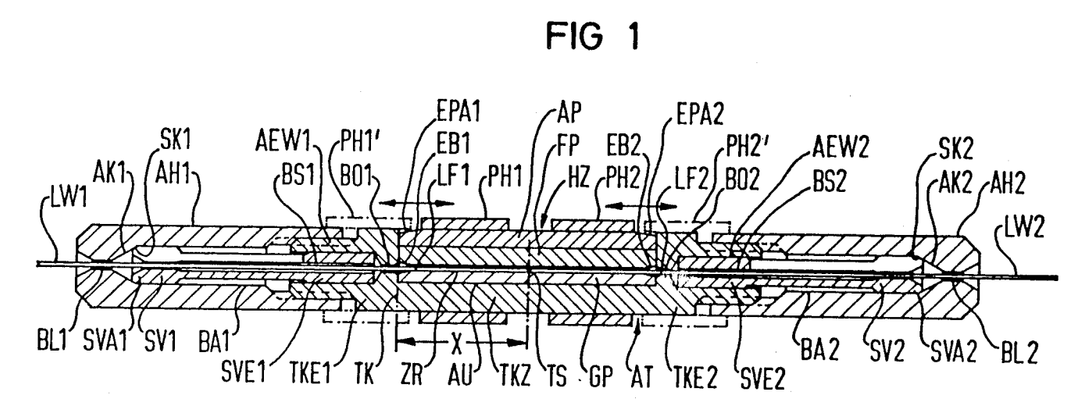
FIG. 1 is a longitudinal cross sectional view of a connector device in accordance with the present invention.

The principles of the present invention are particularly useful in a connector device, which is illustrated in FIG. 1, and has a receptacle part AT that forms a middle part of the overall arrangement. The receptacle part AT is fashioned as a bipartite or of two parts, and includes a cylindrical member TK that has a middle region or area TKZ with a recess AU. A central retaining part HZ, which includes a cover plate AP and a guide plate FP, is inserted into the recess AU, and these two parts are held together on the outside by two pressure sleeves or members PH1 and PH2.

Figure 2:
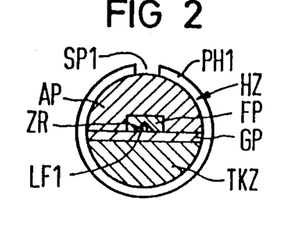
FIG. 2 is a transverse cross sectional view of the connector of FIG. 1.

The recess AU extends over half of the cross section of the carrier member TK and, thus, has a depth that is greater than the radius of curvature for the member TK. A base plate GP extends over the full cross sectional width of the recess AU and, advantageously, is composed of either a silicon or glass lamina. This base plate GP has a roughly rectangular cross section, as illustrated in FIG. 2. The guide plate FP lies on the base plate GP, and this guide plate FP, likewise, is advantageously composed of a silicon material or a glass material and, preferably, has a V-shaped centering groove ZR. The centering groove ZR has its opening directed towards the base plate GP and accepts a stripped optical fiber LF1 ot LF2. A stripped optical fiber is one whose coating or jackets have been removed. The optical fibers LF1 and LF2 are pressed against the base plate GP by the guide plate FP. The guide plate FP is arranged in a corresponding longitudinal exending channel of the cover plate AP and the overall structure formed of the middle region TKZ of the carrier member TK, the base plate GP, the guide plate FP and the cover plate AP, again, has a circular contour on the outside, as seen in FIG. 2. The press sleeves or members PH1 and PH2 are expediently constructed as a slotted sleeve, which has a gap that extends in the axial direction that is references SP1 for the sleeve PH1 of FIG. 2. In its end region, EB1 and EB2, the guide plate FP has a corresponding spread admission funnel in order to facilitate the introduction of the optical fibers LF1 and LF2 into the groove ZR of the guide plate FP. It can also be expedient to, likewise, provide a corresponding expansion yielding admission funnel in the base plate GP corresponding to the end regions EB1 and EB2. The carrier member TK has end regions TKE1 and TKE2, which are, likewise, constructed circularly round on the outside periphery and, respectively, have bores BO1 and BO2 in their center that are dimensioned so that the light waveguide LW1 and LW2, which are still provided with the coatings or jackets, can be pushed into these bores. The coating of the light waveguides LW1 and LW2 is removed so that a stripped part of the optical fiber, i.e., the region LF1 or LF2, extends approximately up to the joint TS. The beveled end region EB1 and EB2 at the guide plate FP thereby simultaneously forms a stop or detent for the end face of the fiber jacket.

Each of the end regions TK1 and TK2 of the carrier member TK are provided with an external threading. Two ends, caps or members AH1 or AH2, which have an internal thread can be threaded onto the threads of the end regions TK1 and TK2 to form screw connections AEW1 and AEW2, respectively. The outer end members or caps AH1 and AH2 can be outer sleeves which have a bore BA1 or BA2 that is of a greater length than the threaded portion mentioned hereinabove. The bores BA1 and BA2 serve for the acceptance of gripping means SV1 and SV2. At the outer end of the sleeve AH1 and AH2, the large bore BA1 or, respectively, BA2, merges into a narrower bore BL1 or, respectively, BL2 that is dimensioned so that the light waveguide LW1 or, respectively, LW2, with the jacket, can be pushed through. At the point of going from the bore BA1 to the bore BL1, a conical camming surface AK1 is provided. In a similar manner, a conical canning surface AK2 is provided between the bore BA2 and BL2. The gripping means SV1 or SV2 serves the purpose of providing strain relief for the light waveguides LW1 and LW2, which are arranged in the inside of the bores BA1 and BA2. It is assumed in the present example that the gripping means SV1 or, respectively, SV2, is composed of a sleeve with axially extending slots at one end to form a type of three-jaw chuck, which has a conical bevel SK1 or SK2 on the one end, which coacts with the conical camming surface AK1 or AK2, respectively. Each of the chuck devices SV1 or SV2, at the other end, has an inwardly directed end region SVE1 and SVE2, respectively, which are held in a bore of the end region TK1 or TK2 of the carrier member TK and each of these chuck devices has a through bore BS1 and BS2, respectively, which is of a size for accepting the jacketed waveguide LW1 or LW2.

The connecting device of FIGS. 1 and 2 is operated in the following manner. First, as indicated by the arrows, the two press sleeves or members PH1 and PH2 are pushed from the assembled positions, illustrated in hold lines, to a disengaged position PH1' and PH2', which are shown in broken lines. As a result of this movement, the contact pressure in the central region of the receptacle part AT is removed and the guide plate FP and the cover plate AP can move in a radial direction to a certain extent. This facilitated in that the end regions EPA1 and EPA2 of the cover plate AP are somewhat bevelled so that with the degree of the bevel determining the size of radial play provided for the insertion of the light waveguides LF1 and LF2. At the same time, it is thereby assured that the individual parts do not completely fall apart or become disassembled because the overall arrangement is preserved in a pre-assembled condition. The light waveguide LW1 and LW2, which have been stripped of their coatings for a length X of about 5 mm. The length X is selected somewhat larger than the distance between the admission region EB1 of the guide plate FP and the center plane or joint line TS for the two light waveguides, which lies roughly in the middle of the guide plate FP.

The two outside sleeves AH1 and AH2 are unthreaded a few turns, and this assures that the clamping devices or means SV1 and SV2 are loosened and, with the two press sleeves or members PH1 and PH2 in the non-pressing position PH1' PH2', the interior of the device will loosely receive the light waveguides. A part of the press sleeve PH1 will extend inwardly onto the bevelled portion EPA1 of the cover plate AP. This bevel, which, as mentioned before, allows radial play between the plate GP which is rigidly attached in the carrier member TK and the guide plate FP. This play facilitates the introduction of the optical fiber.

The first fiber, for example LW1, is now inserted up to the engagement of the end of the jacket or coating, with the detent or stop formed by the bevelled end regions EB1 and EB2 of the guide plate FP. The centering groove ZR and the guide plate FP, of course, is dimensioned so that it practically allows only the stripped optical fiber LF1 to be accepted. It can be advantageous to then retract the inserted fiber somewhat, for example, by about 1 mm after it has reached the stop formed by the end EB1. The associated press sleeve PH1 is now lightly slipped onto the receptacle part AT to a partially inserted position which is between the two positions illustrated. The degree to which the press sleeve is displaced depends thereupon that the opposite, right hand sub-region of the receptacle part AT provided for the acceptance of the optical fiber LF2 has not yet been clamped. The bevel in the region EPA1 also has the advantage that it is more likely to act to the effect that the right hand part of the central retaining part HZ is pressed up or raised rather than pressed down. By turning the outside sleeve AH1, the clamping means SV1 is now pressed together in a radial direction and firmly retains the coated waveguide LW1. This is achieve by the engagement of the conical regions AK1 and SK1 of the outer sleeve AH1 on the clamping means SV1. The strain relief and the intercept of the light waveguide LW1 is thus assured. A manual tightening of the outside sleeve AH1 thereby suffices, and this is potentially provided with a knurl or the like. No tool, thus, is required for this assembly.

In a sililar way, the light waveguide LW2 that has been stripped over the length X (about 7 mm) is now inserted into the loosened outside sleeve AH2. While inserting each of the fibers, they can be turned to facilitate their insertion and the insertion of the second fiber LW2 continues until the two fiber ends of the optical fibers LF1 and LF2 abut one another. An appropriate amount of immersion fluid is present in the region of the joint TS or, respectively, in the region between the guide plate FP and the base plate GP. Subsequently, the optical fiber LF1 is bent or curved somewhat so that an adequate pressure occurs in the direction of the joint TS and is retained. The press sleeve PH2 is now displaced out of its relaxed or unclamping position PH2' towards the final clamping position, which is shown in bold lines, and reaches this final position PH2. Since the splice location itself comprises stripped optical fibers LF1 and LF2 is now adequately secured, the outside sleeve or cap AH2 is screwed tightly onto the end TKE2 and in the direction toward the joint TS and the contact pressure required for the clamping is thereby generated because of the clamping means SV2 in the way already set forth. At the very end, the left hand press sleeve PH1 is pushed to its final position PH1.

Figure 3:
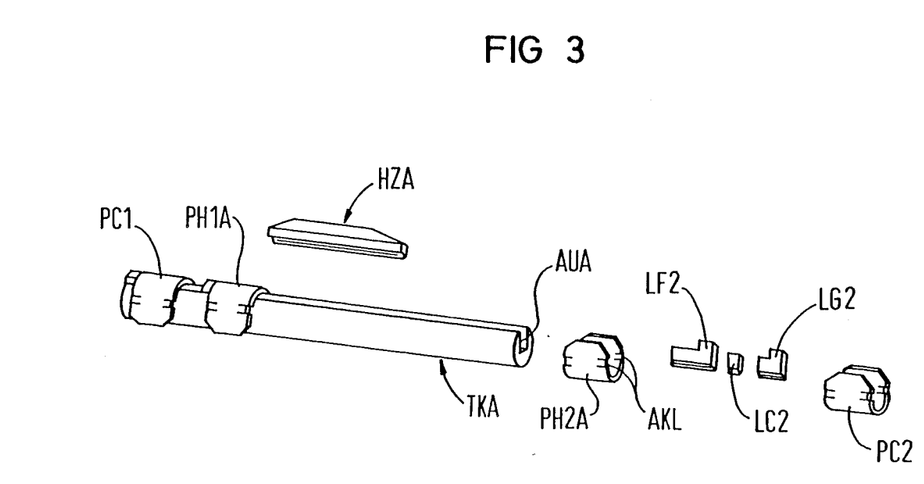
FIG. 3 is an exploded perspective view of a first embodiment of the connector device of FIG. 1.

Compared to the exemplary embodiments of FIGS. 1 and 2, for the fixing of light waveguides LW1 and LW2, which still have a protective coating, other connectors can be designed even more simply than as set forth hereinbelow. Insofar as parts identical to the parts in the embodiment of FIG. 1 are used, the reference characters, thereby, are retained and have been merely expanded by adding a letter A. Thus, the carrier member TKA, comprising a longitudinal channel or recess AUA, is provided in the embodiment of FIG. 3. A base plate (analogous to the plate GP in FIG. 1), that is not visible in FIG. 3 is placed in this longitudinal channel and the opening in the joint region is covered by a central retaining part HZA. The two pressed sleeves or members PH1A and PH2A are provided with a slot that serves the purpose of fixing the central retaining part HZA in the way described in FIG. 2.

Deviating from the embodiment of FIG. 1, the holding or, respectively, intercept of the unstripped light waveguies LW1 and LW2 is also accomplished with the press sleeves that are reference PC1 and PC2. These press sleeves are constructed in exactly the same way as the press sleeves PH1A and PH2A and serve the purpose of fixing the unstripped optical fibers. In detail, the channel AUA extends into the region in which the intercept of the jacketed or unstripped light waveguides is to be undertaken. A series of insert pieces are provided in the longitudinal channel AUA for holding the unstripped light waveguides. As illustrated in FIG. 3, these insert pieces include a fiber guide LF2, a fixing part LC2, which serves the purpose of fixing the unstripped light waveguide and a guide part LG2 for the unstripped light waveguide. These component parts have longitudinaly extending channel on their undersurfaces, which channels preferably have a roughly V-shaped or U-shaped design, and serve for the acceptance of the corresponding unstripped light waveguide, as illustrated by the pieces LC2 and LG2. The channels in the fiber guide LF2 are matched to the outside diameter of the stripped, bare optical fiber.

The advantage of the embodiment of FIG. 3 is that only one type of press sleeve PC1, PC2 or PH1A and PH2A is required both for the fiber fixing, as well as for fixing of the unstripped light waveguides. The fixing itself in the completely assembled condition occurs by a simple longitudinal displacement of these press sleeves or clips and no tools are normally required for this purpose. The longitudinal displacement and fixing can be carried out with the fingers alone. The longitudinal displacement of the press sleeves PC1-PH2A is facilitated by two respectively clip-shaped jogs or projections AKL, which are provided on each of the press sleeves. The jogs, such as AKL, offer a better hold for the thumb nail or, respectively the tips of the fingers. Annular beads, buttons or the like can also be pressed out of the circumference of the press sleeves instead of the jogs.

Figure 4:
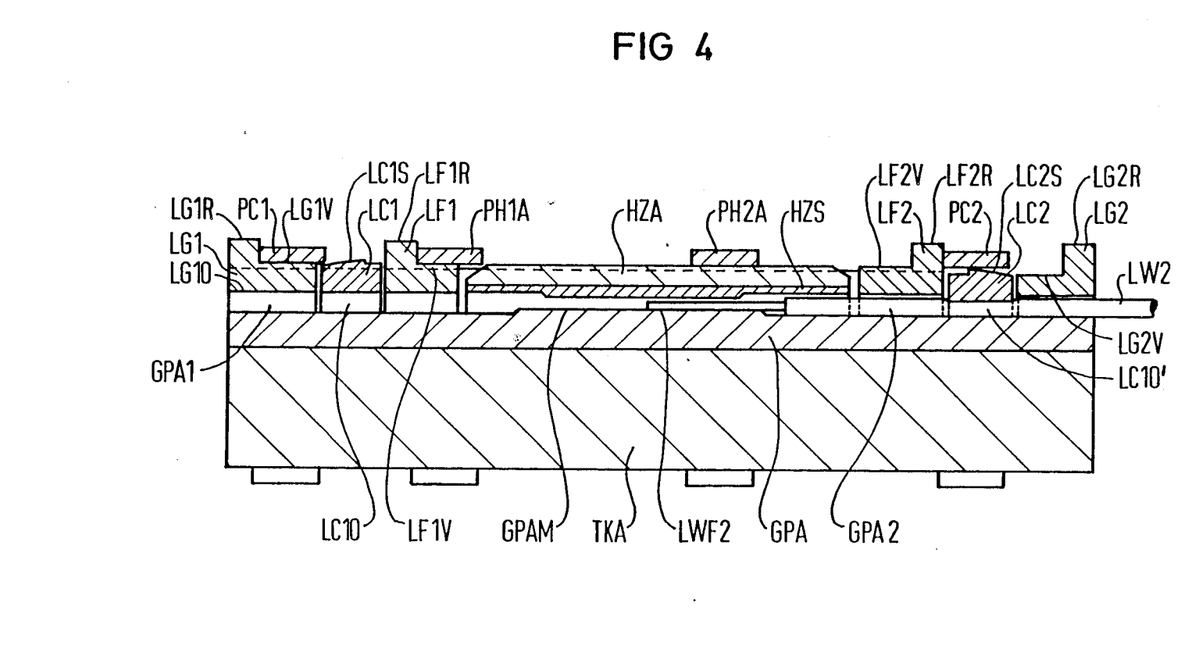
FIG. 4 is a longitudinal cross sectional view of the first embodiment of FIG. 3.
Figure 5:
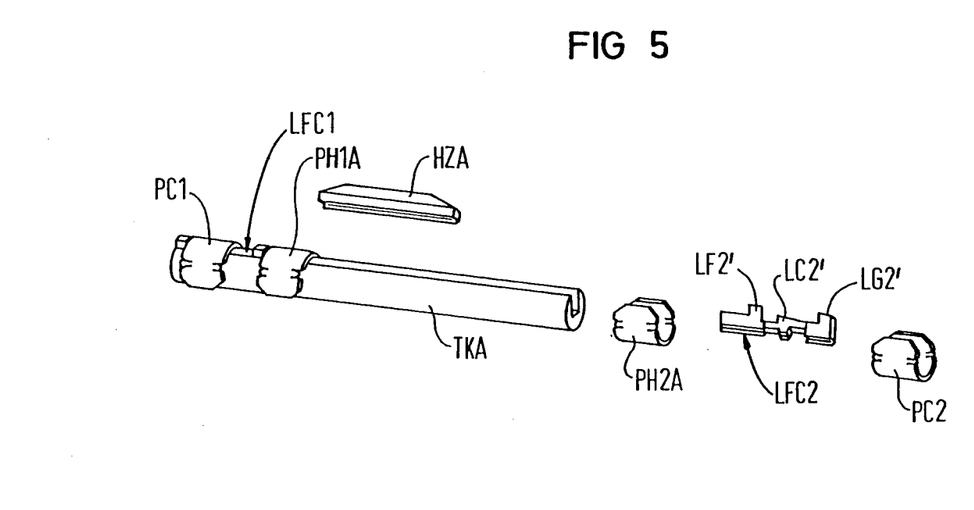
FIG. 5 is an exploded perspective view of a second embodiment of the connecting device according to FIG. 1.

The assembly of the embodiment is best illustrated in FIG. 4. The base plate GPA is inserted into the channel AUA of the carrier member TKA and, preferably, is composed of silicon and may have, as illustrated, a region GPAM in the middle portion that is elevated and serves the purpose of accepting the stripped optical fibers, such as LWF2. The corresponding lower outside parts GPA1 and GPA2 serve the purpose of fixing the unstripped light waveguides LW1 and LW2. This structure of the base plate GPA is, preferably, accomplished with a silicon etching technique.

The left hand part in FIG. 4 shows the condition of the press sleeves PC1 and PH1A while introducing the light waveguide. The guide part LG1 has an elevated outer edge or projection LG1R and a corresponding lower portion LG1V. An inside surface which forms a guide or the projection LG1R forms a stop for the press sleeve PC1. The guide part LG1, for the jacketed light waveguide, is laterally arrested or secured in the guide channel AUA (FIG. 3), for example by gluing, interlocking or the like. The through-opening LG1O, which has the form of a V-shaped channel of the guide part LG1, is selected of such a size that the unstripped light waveguide can be inserted with the clearance being greater than the outside diameter of the jacketed or coated waveguide. In order to facilitate the fiber introduction, the through-opening, for example in the guide part LG1 and LG2, can be conically expanded. Likewise, the base plate GPA can be provided with bezels or admission funnels or bevels on their ends.

As illustrated in FIG. 4, wach of the fixing parts LC1 and LC2, on an upper surface, have a cam or bevel LC1S and LC2S that is dimensioned so that the opening LC1O will be approximately the same as the opening LG1O when the press sleeve or member PC1 has been pushed to the position illustrated by the sleeve PC1 in FIG. 4. This allows the introduction of a jacketed light waveguide, such as the waveguide LW2 on the right hand side of the Figure. After the introduction of the waveguide has been ended due to the end of the jacket engaging the surface GPAM, the press member or sleeve PC2 is then pushed to the position, such as illustrated in the right hand side of the Figure by the sleeve PC2 engaging the fixing part LC2 to bias the part LC2 radially inwardly to grip the light waveguide LW2 as illustrated. The coaction of the cam surface, such as LC2S and the pressure member PC2 acts to cause the opening to assume a smaller dimension, such as the opening LC1O' of FIG. 4. In contrast to the guide part LG1 and LG2, the fixing parts LC1 and LC2 are constructed so that they may be pressed towards the inside by the elastic deformation of the pressure members PC1 and PC2 and this will cause the through-opening, as shown by the portion LC1O', to be achieved due to the action of the pressure member or sleeve PC1 or PC2, respectively. To this end, the fixing parts LC1 and LC2 can be fabricated, for example of metal of plastic material. In a plastic version, the remaining lateral webs are so thin that they can be stretched, as seen in a direction towards the base GPA.

However, it is also possible to make the fixing parts LC1 and LC2 of metal so that they are held with play in the channel AUA. Overall, care must merely be exercised that the radial displaceability toward the inside to an extent needed for the fixing of the jacketedf waveguides, for example LW2, is possible at the fixing part LC1 and LC2. Given the metal version of the fixing part LC1, the through passage LC1O, at its ends, is to be slightly bezeled or rounded, since the ends of the light waveguides LW1 and LW2 could, otherwise, not lift the fixing part.

The part LF2, which serves for the fiber guidance, is, likewise, firmly held in the longitudinal channel AUA and comprises a lower portion LF2V that terminates roughly with an upper side of the upper edge of the carrier member TKA formed by the longitudinal channel AUA. By longitudinal displacement, as shown by the pressure member PH1A, the pressure member is displaced into the middle region, as shown by the pressure member PH2A to press the stripped optical fibers provided in the region of the elevation GPAM firmly down with the central retaining part HZA.

The parts LF1 and LF2, as well as the parts LG1 and LG2, also, respectively, form stops or detents for the pressure members PH1A, PH2A, as well as for the members PC1 and PC2, and these members have projections LF1R and LF2R, as well as G1R and LG2R, to limit the longitudinal displacement and insure the captivity of the pressure members, such as PC1, PC2, PH1A and PH2A. The slot opening of these pressure members, such as PC1, PC2, PH1A and PH2A, are selected of such a size that they can have their openings pressed past the projection parts LF1R and LF24, as well as LG1R and LG2R.

The press sleeves PC1 and PC2, as well as PH1A and PH2A, are provided with corresponding longitudinal slots so that they can also be slipped onto the carrier member TKA, as illustrated in FIG. 3, in a snap-in fashion in a radial direction as well. They are, thus, formed of a resilient fashion, for example, a spring steel. A turning of the press sleeve subsequently insures that the longitudinal slot, which may be seen in the left hand part of FIG. 3, points down, whereas the saddle-shaped closing part of these sleeves lies in a region of the individual parts HZA and LC1 and LC2, which are inserted into the longitudinal channel AUA and secure these members in their position and effect the clamping both of the cladded light waveguide regions, as well as the stripped light waveguide regions.

A second embodiment of the connector device is illustrated in FIGS. 5–10 and includes press members PC1, PC2, PH1A, and PH2A, a carrier member TKA, and a central retaining part HZA, which are the same as in the embodiment of FIG. 3. The modification merely comprises that the individual parts LF2, LC2 and LG2 of FIG. 3, which form the waveguide gripping means for the coated light waveguide or jacket waveguide are constructed as a single component that is referenced LFC2 on the left, and LFC1 on the right, in FIG. 5. In terms of the fundamental structure, the individual subregions have remained the same as the structure described in greater detail in accordance with FIGS. 3 and 4 and corresponding reference with the same reference characters with a prime, such as the guide part LF2' for the stripped fiber, a fixing part LC2' for the coated light waveguide, and a guide part LG2' for the coated light waveguide.

Figure 6:
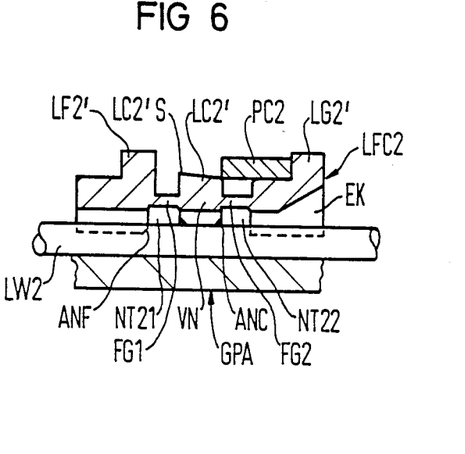
FIG. 6 is a partial longitudinal cross sectional view with the device in a release or non-clamping condition.
Figure 7:
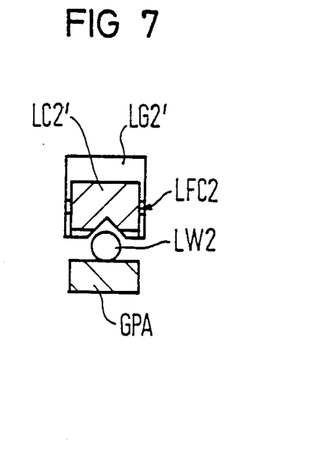
FIG. 7 is a transverse cross sectional view of the portion of FIG. 6 in a non-clamping position.

As illustrated in FIGS. 6 and 7, the base plate GPA is shown with the clamping member or retaining part LFC2. The clamping part LFC2 has an inner guide part LF2', the fixing part LC2' and an outer guide part LG2', which are connected to one another by a thin hinge FG1 and FG2. The guide part LF2' is permanently retained in the end of a channel AUA of the member TKA with a press fit. The fixing part LC2' is dimensioned to be narrower than the firmly seated guide part LF2' and LG2', as illustrated in FIG. 7. It can be freely moved in a radial direction and the restoring movement of the film or thin film-like hinges FG1 and FG2 always folded in a favorable introduction position for the light waveguide LW2 of FIGS. 6 and 7. The threading of the fiber is facilitated by an introduction cone EK in the outer guide part LG2' and by bezels ANF and ANC on the guide parts LF2' and the fixing part LC2', respectively.

As illustrated in FIG. 6, the ring PC2 is in the retracted position so that the fixing part LC2' is in a raised, non-gripping position.

Figures 8, 9:
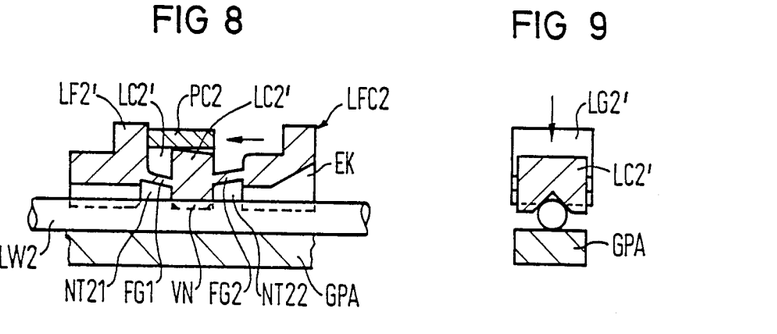
FIG. 8 is a partial longitudinal cross sectional view similar to FIG. 6, with the device in a clamping condition.
FIG. 9 is a transverse cross sectional view showing the device in a clamping condition.

In FIGS. 8 and 9, the coated waveguide LW2 is firmly clamped on the base GPA. To accomplish this, the clamping sleeve PC has been axially displaced to such an extent that it has pushed onto the slanting cam surface LC2'S of the middle part LC2' of the common retaining parts LFC2 and presses the material inward to such an extent that this material comes into contact with the coated light waveguide LW2. The film hinges FG1 and FG2 are, thus, stretched. In order to facilitate material displacement and the clamping effects as a result thereof, channels NT21 and NT22 are provided in the common retaining and clamping part, as illustrated. The fixing part LC2' has a wedge-shaped body VN, which lies between the two channels NT21 and NT22, and this wedge-shaped body VN is pressed down in the radial direction and, as may be seen in FIG. 8, lies against the coating of the light waveguide LW2 in a fashion to clamp and retain it in position. It is expedient to manufacture the common retaining and clamping part LFC2 of elastic material so that a longitudinal displacement of the press member PC2 out of the position shown in FIGS. 8 and 9 into a position of FIG. 6 allows the light waveguide LW2 to be, again, released and, for example, a renewed or improved fiber guidance and clamping can be carried out. Due to this restoring moment, the over-stretched hinges FG1 and FG2 can spring back into the shape of FIG. 6 and release the light waveguide LW2. In the relaxed condition of FIGS. 6 and 7, the light waveguide LW2 can be removed from the clamping device in a simple way and, for example, following a reworkinh of its end face or reconditioning thereof can be again introduced. The common retaining and clamping part LFC2 need not be removed for this repeated mounting procedure, because the release of the light waveguide LW2 occurs in a simple and reliable way on the basis of elastic resiliency of the middle part.

Figure 10:
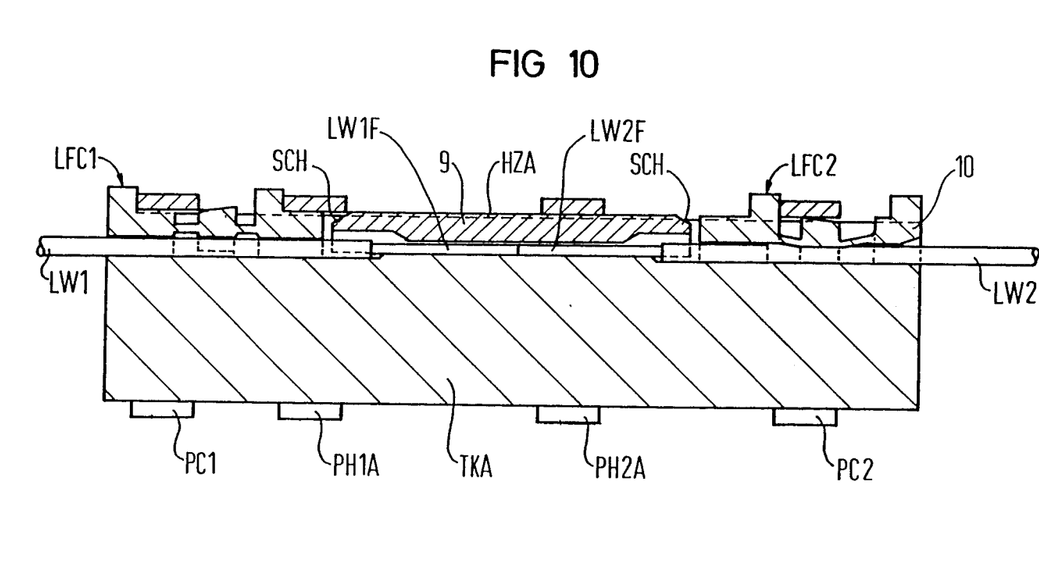
FIG. 10 is a longitudinal cross sectional view of the complete second embodiment of FIG. 5.

FIG. 10 shows the complete connector comprising individual structures of the part, such as LFC2 of FIGS. 6–9, and shows the waveguide LW2 being clamped in position because of movement of the retaining ring or pressing member PC2 and shows the waveguide LW1 being in a released position due to the position of the clamping ring PC1. In addition, the central retaining part HZA is provided with bevels SCH at its ends and the clamping ring PH1A is pushed against the clamping means LFC1 so that it does not lie on the central retaining part HZA. Upon introduction of the light waveguide LW1, the central retaining part HZA will be lifted radially, however, it cannot fall out of the channel AUA, since it is held by the clamping rings PH1A and PH2A. After positioning the waveguide LW1, the two rings PC1 and PH1A are then shifted to the right to cause a clamping of the waveguide LW1 and also clamping of the retaining part HZA on the stripped waveguide portion LW1F. The right hand part of FIG. 10 shows the final position clamping both of the optical fiber LW2F and the coated waveguide LW2. The base part TKA and the central retaining part HZA are dimensioned in the same manner as the embodiment of FIG. 5. Both parts are injection molded of a high-strength plastic reinforced with glass or carbon fibers. Hard, brittle plastics, such as PPS or Ryton have the greatest possible long-term strength and are, thus best suited for these parts. A clamping member LFC1 and LFC2 are to be injection molded of a plastic having a high fatigue strength under reversed bending stresses and having good long-term durabilities. Plastics, such as POM, ABS and PUR can be utilized for this part.

Figure 11:
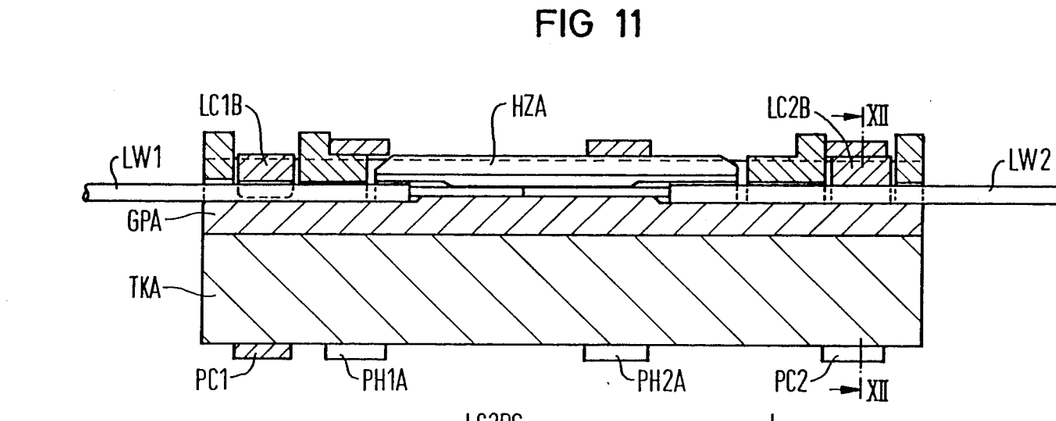
FIG. 11 is a longitudinal cross sectional view of a third embodiment of the connector device in accordance with the present invention.
Figure 12:
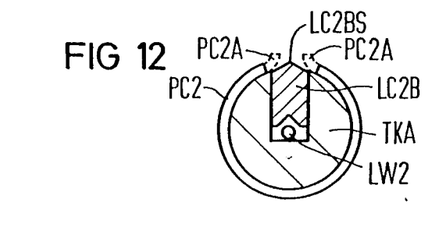
FIG. 12 is a cross sectional view taken along the lines XII—XII of FIG. 11, showing the device in a non-clamping condition.
Figure 13:
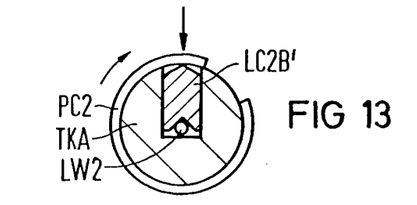
FIG. 13 is a cross sectional view taken along the lines XII—XII of FIG. 11, with the device in a clamping condition.

A third embodiment of the connecting part is illustrated in FIGS. 11–13, wherein the clamping of the coated light waveguide, such as LW2 is not carried out by a longitudinal displacement, but by a turning or rotating of the respective pressure members PC1 and PC2. In detail, a part LC52B, which corresponds to a part LC2 in FIG. 3, or LC2' in FIG. 5, serves for the fixing or clamping of the coated light waveguide LW2. This portion or part LC2B is constructed so that it projects beyond the circular profile of the carrier member TKA, as illustrated in FIG. 12. This projecting portion of the clamping element LC2B is, preferably, constructed with a triangular configuration and ia referenced LC2BS. The retaining part of metal is received in the channel of the part TKA. In the condition during assembly, the press sleeve PC2 is arranged so that its longitudinal slot, which is fashioned larger than the width of the clamping element LC2B, lies so that the clamping element LC2B can be displaced radially, i.e., lies in a radially movable and released position, as shown in FIG. 12 or a clamping position LC2B1' (FIG. 13). In this position, the coated waveguide LW2 can be inserted in an axial direction and slide along in the guide channel of the retaining and clamping part LC2B. As soon as the light waveguide LW2 has reached its final assembly position, the press member or sleeve PC2 is then turned and its ends slide across the upwardly projecting tip LC2BS of the clamping part LC2B and, as shown in FIG. 13, presses this part down onto the coated light waveguide LW2 to thereby retain and lock it in the position. The other part LC1B is identical to the part LC2B.

As indicated in broken lines, it is possible to provide upwardly projecting projections or end PC2A on the edges of the sleeve PC2. The clamping part LC2B is held captive in its position because the projections PC2A prevent it from falling out and, nonetheless, supply an adequate radial play.

Given an appropriate design of the central retaining part HZA, for example with an upwardly directed triangular bevel, it is also possibel to, likewise, move the fixing part of this central part into a gripping position by turning the pressing sleeves PH1A and PH2A in a similar manner. There is also the possibility here of carrying out captive mounting of this part by a corresponding shaping of the press sleeves PH1A and PH2A analogous to the projections PC2A.

Figure 14:
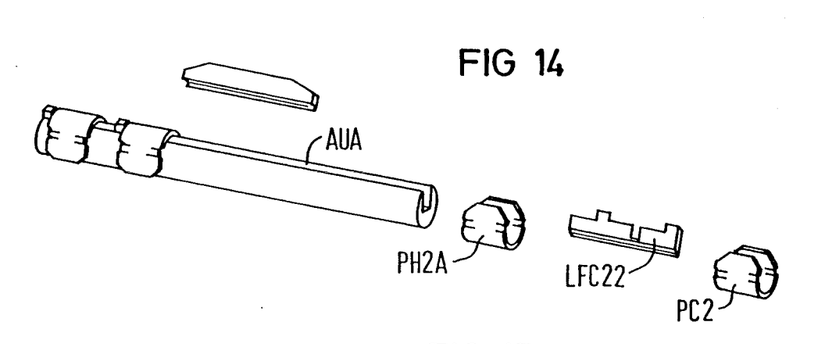
FIG. 14 is an exploded perspective view of a fourth embodiment of the connector device according to the present invention.
Figure 15:
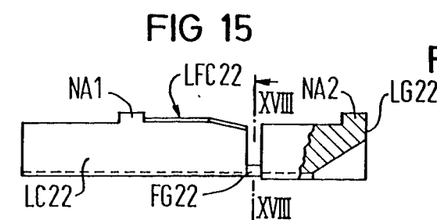
FIG. 15 is an enlarged side view, with portions broken away, of a portion of the connector device of FIG. 14.
Figure 16:
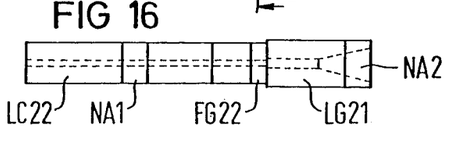
FIG. 16 is a top plan view of the part of FIG. 15.
Figure 17:
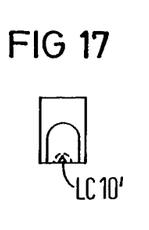
FIG. 17 is a right end view of the part of FIG. 15.
Figure 18:
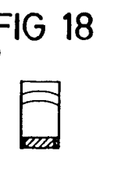
FIG. 18 is a cross sectional view taken along the lines XVIII—XVIII of FIG. 15.

A fourth embodiment of the connecting part is illustrated in FIGS. 14–18, and in this embodiment, the retaining part LFC22 has been improved, as illustrated by the FIGS. 15–18. The guide portion LG22 is pressed into the channel AUA. A film hinge FG22 connects the guide portion or part LG22 to the fixing part or portion LC22, as shown in FIGS. 15, 16 and 18. The fixing part LC22 is narrower than the part LG22. The film hinge FG22 is to be designed so that the fixing part LC22 does not tear off when the press sleeve or member PH2A is slipped on. The fixing part LC22 has a nose or projection NA1, while the part LG22 has a nose or projection NA2. These projections serve as stops for the axial displacement of the press members PH2A and PC2, respectively. However, the film hinge FG22 is to be designed so elastically that the light waveguide can still slightly lift the fixing part LC22 in a radially upward position. The right hand portion or part LG22 of FIGS. 15 and 16 is pressed into the channel AUA, and left hand portion is movable.

A V-shaped through opening LC10' (FIG. 17) is continuous along the lower part of LFC22. A large admission funnel facilitates the threading of the light waveguide and is provided in the part LG22.

Figure 19:
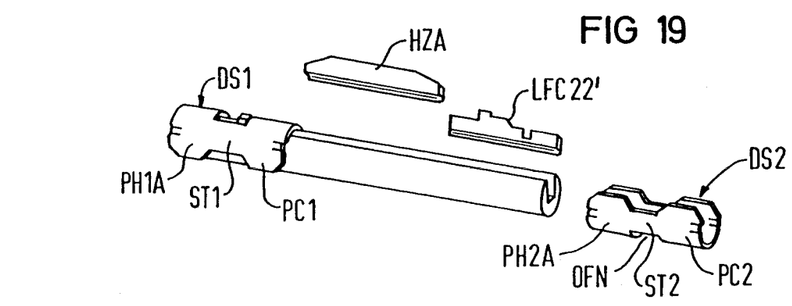
FIG. 19 is an exploded perspective view of a fifth embodiment of a connector device in accordance with the present invention.
Figure 20:
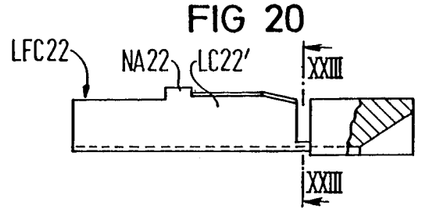
FIG. 20 is an enlarged side view, with portions broken away, of a gripping part of the embodiment of FIG. 19.
Figure 21:
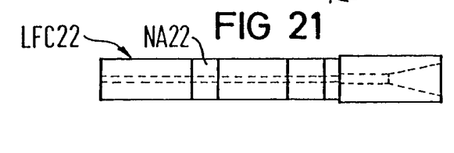
FIG. 21 is a top plan view of the part of FIG. 20.
Figure 22:
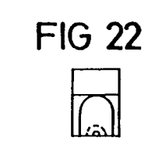
FIG. 22 is a right end view of the part of FIG. 20.
Figure 23:
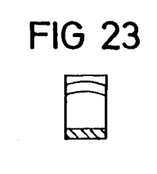
FIG. 23 is a cross sectional view taken along the lines XXIII—XXIII of FIG. 20.

In FIG. 19, a modification of the connector of FIG. 14 is illustrated. In this modification, the two press sleeves PH1A and PC1, as well as PH2A and PC2, are connected with webs, such as ST1 and ST2, so that a single press sleeve provides a double function and is fashioned as a double press sleeve DS1 or, respectively, DS2. The double press sleeves DS1 and DS2, which comprise a web, such as ST1 or ST2, are to be punched before they are rolled. The clamping of the optical fiber ends with the central main element HZA and of the coated waveguide with a common fixing part LFC22', thus, occurs here in one working step. A clamping at the coating before the central retaining part HZA presses on the optical fiber would be desirable for prefixing of the waveguide.

According to FIGS. 20–23, the common retaining part LFC22' is produced with only one projection nose NA22. This serves as a right hand, as well as left hand stop for the double press sleeve or ring DS2, and lies in the opening OFN, which lies between the two webs ST2 of the double press sleeve DS2.

Figure 24:
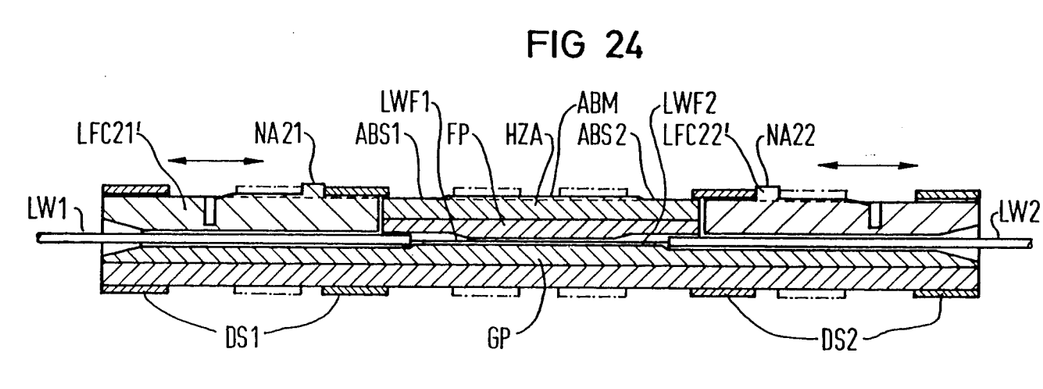
FIG. 24 is a longitudinal cross sectional view of the connector device of FIG. 19.

A connector utilizing the double stops is illustrated in FIG. 24. As illustrated, initially, the double press sleeve DS1 or, respectively, DS2, is pushed all the way out and strikes against the projecting nose NA22 of the respective retaining parts LFC21'. The light waveguide LW2 can be introduced from the right. When the double press sleeve DS2 is pushed somewhat toward the middle of the connector, then it first clamps only the coating of the light waveguide LW2. The left hand light waveguide LW1 can then be pushed forward until it strikes against the end of the stripped portion LWF2 of the light waveguide LW2. The double press sleeve DS1 is then pushed all the way up to the stop NA21 into the position shown in broken lines. The central retaining part HZA has its ends laterally provided with longer stepping portions ABS1 and ABS2 so that the middle part ABM1 is fashioned with an elevated configuration. When the double press sleeve DS2 is pressed further forward, it clamps the central retaining parts HZA onto the end of the stripped optical fiber LWF2 because it lies on the elevated middle part ABM, as does the sleeve DS1. Test having good results were carried out with prototypes according to FIG. 24, and the inside precision parts, such as the base plate GP and the guide plate FP, were manufactured of silicon instead of plastic.

Instead of only a single light waveguide, it is also possible to position a plurality of light waveguides side-by-side in parallel in a clamping device according to the preceding Figures. A corresponding plurality of parallel channels is then to be provided. For example, in the corresponding guide and mount, for example a guide LFC22' for the light coated waveguide, and a corresponding plurality of V-shaped channels are provided in the region of the base plate GPA and/or in the central retaining part HZA.

Figure 25:
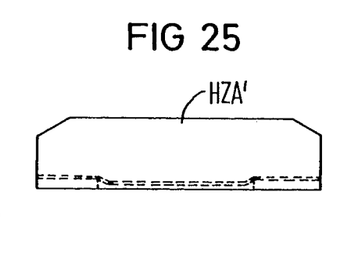
FIG. 25 is an enlarged cross sectional view of a center part of FIG. 19 illustrating a first modification.
Figure 26:
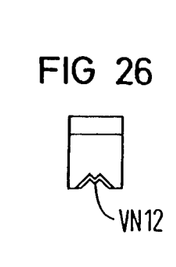
FIG. 26 is an end view of the part of FIG. 25.

FIG. 25 shows a central retaining part HZA' in a side view, and FIG. 26 shows it in an end view. A double V-channel VN12 is provided for the two optical fibers that are not shown here.

Figure 27:
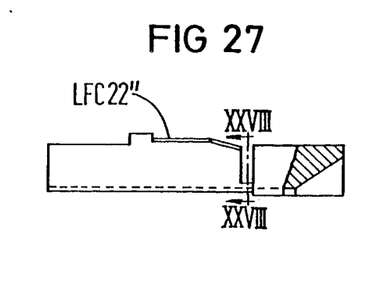
FIG. 27 is an enlarged side view, with portions broken away, of a modification of a part of the device of FIG. 24.
Figure 28:
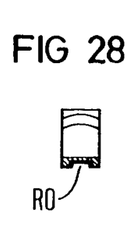
FIG. 28 is a cross sectional view taken along the lines XXVIII—XXVIII of FIG. 27.

FIGS. 27 and 28 show a guide part LFC22" similar to the part illustrated in FIGS. 20–23, which is modified only to the extent that an enlarged, rectangular opening RO for the simultaneous acceptance of two coated light waveguides is provided.

The splicing part or fiber connector of the invention is distinguished by a simple structure, by fast tool-free assembly, and by achieving low attenuation values in the range of 0.0–0.2 dB, given a great temperature range of between −40° C. and +85° C. These values were obtained by utilizing the structure, such as illustrated in FIGS. 11–13.

Although various minor modifications may be suggested by those versed in the art, it should be understood that I wish to embody within the scope of the patent granted hereon all such modifications as reasonably and properly come within the scope of my contribution to the art.

I claim:

1. A connector device for connecting at least two waveguides in an end-to-end abutting relationship, said connector device having a receptacle part having guides for the light waveguides, said receptacle part being constructed of at least two parts with one being a carrier member provided with a recess and the other part being a central retaining part movable in a radial direction in the recess of the carrier member, a pair of press members being mounted on the carrier member and movable from a position loosely holding the central retaining part in the recess to a second position forcing the central retaining part into clamping engagement on optical fibers disposed between the carrier members and retaining part, and clamping means adjacent each end of the carrier part for clamping the waveguide in the carrier part, said clamping means including a fixing part movable in a radial direction in a channel of the carrier member, said movable fixing part having a cam surface on outwardly extending surface, a pressing member mounted on the carrier member and movable from a position substantially free of the cam surface of the fixing part to a position engaging the cam surface to urge the fixing part to a clamping position.

2. A connector device according to claim 1, wherein the pressing member moves axially on the carrier member and the cam surface has a slanting surface that slants in the axial direction.

3. A connector device according to claim 1, wherein the cam surface has a triangular tip and the pressing member is a sleeve having a longitudinal slot, said sleeve being twisted with the slot disposed over the triangular tip to a position with the sleeve engaging the triangular tip.

4. A connector device according to claim 3, wherein the sleeve adjacent the slot has outwardly extending projections, said projections acting to hold the fixing part in the recess when the slot is aligned with the tip to allow the fixing part to move to allow passage of the uncoated waveguide.

5. A connector device according to claim 1, wherein the pressing member for the fixing part and the press member engaging the central retaining part are provided as a one-piece double press sleeve that is axially movable on the carrier member.

6. A connector device according to claim 5, wherein the double press sleeve has an opening receiving a single stop projection, said projection limiting the movement of the double press sleeve to a disengaged position and to the clamping position.

7. A connector device according to claim 1, which includes a guide part having a thickness slightly greater than the fixing part, said guide being pressed in the channel of the carrier member as the fixing part is movable therein.

8. A connector device according to claim 7, wherein the guide part and fixing part are a one-piece design with the fixing part being held by an elastic film hinge to the guide part.

9. A connector device according to claim 1, wherein each press member and each pressing member are composed of an elastic material.

10. A connector device according to claim 9, wherein said material is spring steel.

11. A connector device according to claim 1, wherein the central retaining part has an outer end region provided with a bevel extending in an inward direction.

12. A connector device for connecting at least two light waveguides in an end-to-end abutting relationship, said connector device having a receptacle part having guides for the light waveguides, said receptacle part being constructed of at least two parts with one part being a carrier member provided with a recess and the other part being a central retaining part movable in a radial direction in the recess of the carrier member, a pair of press members being mounted on the carrier member and movable from a position loosely holding the central retaining part in the recess to a second position forcing the central retaining part into clamping engagement on optical fibers disposed between the carrier member and retaining part; and strain relief means being provided adjacent each end of the carrier member for clamping a coated light waveguide inserted into said connector device, said strain relief means including each end of the carrier member having threads and a bore, end caps threaded on said carrier member, a clamping element being disposed in each bore of the carrier member, said clamping elements being urged into clamping engagement as the end caps are threaded onto the ends of the carrier member.

13. A connector device according to claim 12, wherein each of the press members is composed of an elastic material.

14. A connector device according to claim 13, wherein said elastic material is spring steel.

15. A connector device according to claim 12, wherein the clamping elements are sleeve-shaped members having a through-bore and having longitudinal slots forming sub-regions, which are movable in a radial direction, said sub-regions having surfaces engaging a camming surface on one of the end caps and carrier member so that as the end cap is threaded in the carrier member, said sub-regions are urged radially inward to grip a waveguide disposed in the through-bore.

16. A connector device according to claim 12, wherein the central retaining part has an outer end region fashioned with a bevel extending in an inward direction.

17. A connector device for connecting at least two waveguides in an end-to-end abutting relationship, said connector device having a receptacle part having guides for the light waveguides, said receptacle part being constructed of at least two parts with one part being a carrier member provided with a recess and the other part being a central retaining part movable in a radial direction in the recess of the carrier member, a pair of pressing members being mounted on the carrier member and movable from a position loosely holding the central retaining part in the recess to a second position forcing the central retaining part into clamping engagement on optical fibers disposed between the carrier member and retaining part and means adjacent each end of the carrier member for clamping a coated waveguide disposed therein, said means including a fixing part movable in a radial direction being provided in a channel of the carrier member, said fixing part being pressed radially inward in an assembled condition by a press sleeve, which is movable from a pressing position to a non-pressing position, so that the fixing part will clamp a coated waveguide disposed in said channel.

18. A connector device according to claim 17, wherein the central retaining part has an outer end region fashioned with a bevel extending in an inward direction.

19. A connector device according to claim 17, wherein the means includes a guide part for the coated light waveguuide and a fiber guide part for the stripped optical fiber of the waveguide.

20. A connector device according to claim 17, which includes a guide part, and wherein the fixing part and guide part are provided with a longitudinal channel that extends parallel to the waveguide inserted into the connector device.

21. A connector device according to claim 17, wherein the fixing part is a part of a common retaining and clamping part, which has a second portion forming a guide part.

22. A connector device according to claim 21, wherein the guide part of the common retaining and clamping part is elastically deformable.

23. A connector device according to claim 22, wherein the common retaining and clamping part is composed, as a whole, of elastic material, particularly a plastic material.

24. A connector device according to claim 23, wherein the common retaining and clamping part is composed of PPS material.

25. A connector device according to claim 17, wherein each of the press sleeves has a longitudinal slot having a width so that they can be snapped onto the carrier member.

26. A connector device according to claim 17, wherein each of the pressing members and press sleeves is composed of an elastic material.

27. A connector device according to claim 26, wherein said material is spring steel.

* * * * *